June 24, 1952  G. T. BAKER  2,601,491
MEASURING ARRANGEMENTS
Filed Jan. 7, 1949  3 Sheets-Sheet 1
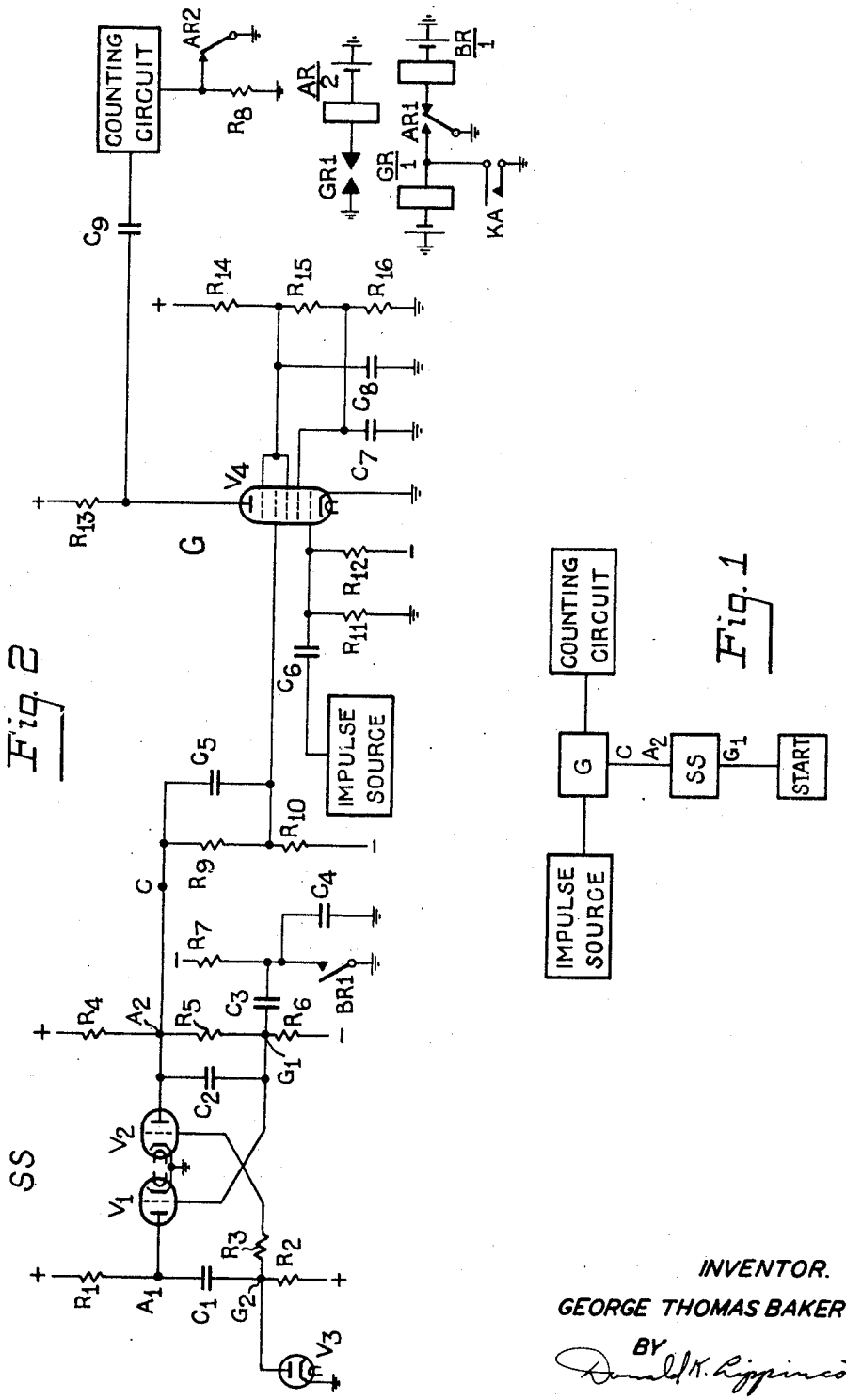
INVENTOR.
GEORGE THOMAS BAKER.
BY
Donald K. Lippincott
ATTORNEY.

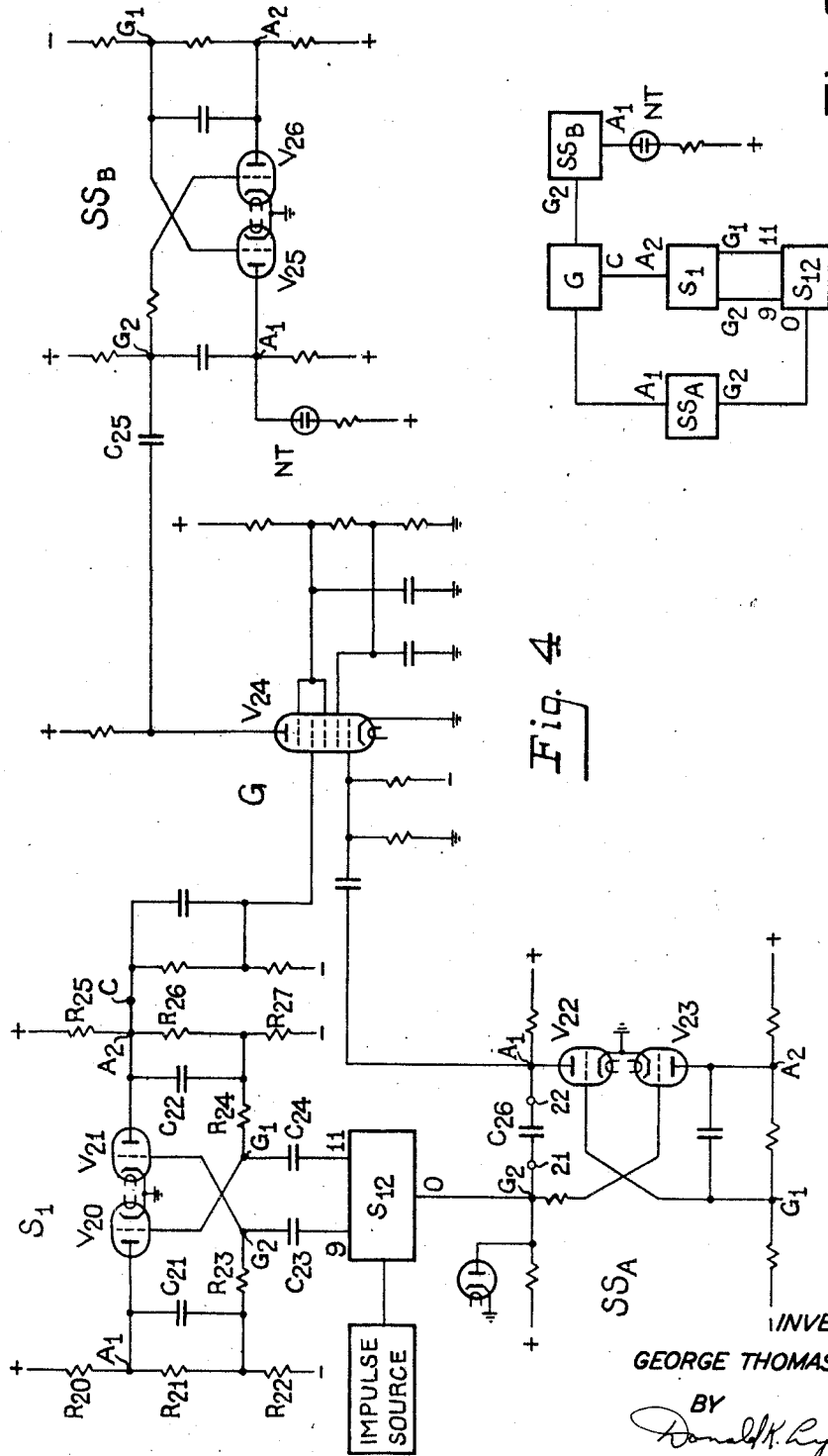

June 24, 1952 G. T. BAKER 2,601,491
MEASURING ARRANGEMENTS
Filed Jan. 7, 1949 3 Sheets-Sheet 3

INVENTOR.
GEORGE THOMAS BAKER.
BY
Donald K. Lippincott
ATTORNEY.

Patented June 24, 1952

2,601,491

UNITED STATES PATENT OFFICE 2,601,491

MEASURING ARRANGEMENTS

George Thomas Baker, Liverpool, England, assignor to Automatic Telephone & Electric Company Limited, Liverpool, England, a British company Application January 7, 1949, Serial No. 69,690
In Great Britain January 30, 1948

3 Claims. (Cl. 175—183)

The present invention relates to circuit arrangements employed for indicating the value of electrical components such as condensers and resistances.

The object of the invention is to provide a circuit arrangement for this purpose which is simple to operate and which can at the same time provide an accurate result.

It is known to measure a short time interval by employing a resistance/condenser combination arranged so that the condenser discharges through the resistance. The time interval is given by $$t = CR \log \frac{E_0}{E_t}$$

where $E_0$ is the voltage across the condenser at the beginning of the interval and $E_t$ is the voltage across the condenser at the end of the interval. From this equation it will be seen that if $$\frac{E_0}{E_t}$$

and either C or R is fixed, the equation becomes $$C = K_1 t$$

or $$R = K_2 t$$

thus the value of the condenser or resistance is directly proportional to the time taken for the voltage across the condenser in a resistance/condenser combination to change from one predetermined value to another. The invention makes use of this relationship to give an indication of the value of a condenser or a resistance.

According therefore to one feature of the invention, in a circuit arrangement for indicating the values of resistances or condensers means are provided for charging and discharging the condenser in a resistance/condenser combination which includes the component to be tested and the time taken for the voltage across the condenser to change from one predetermined value to another is compared with at least one accurate timing device and an indication is given as the result of such comparison.

According to another feature of the invention, in a circuit arrangement for indicating the values of resistances or condensers the condenser in a resistance/condenser combination which includes the component to be tested is initially charged and a discharge circuit is completed and a timing device is set in operation at the beginning of the test, the timing device being arranged to determine the time taken for the voltage across the condenser to decrease from its initial value to a predetermined value and thus provide a measure of the value of the component.

According to a further feature of the invention, in a circuit arrangement for indicating whether the value of a resistance or a condenser is between two limiting values means are provided for changing and discharging the condenser in a resistance/condenser combination which includes the component to be tested and the time taken for the voltage across the condenser to change from one predetermined value to another predetermined value is compared with two time intervals corresponding to the two limiting values of the component, an indication being given whether the discharge time has a value between the two comparison time intervals.

In one embodiment of the invention as applied to the measurement of the value of a component, the timing device consists of an electrical counting circuit to which accurately spaced pulses are fed for the duration of the time interval. Preferably a gate circuit is employed, the initiation of the discharge serving to open the gate and enable impulses from an accurate impulse source to pass to a counting circuit, while when the voltage across the condenser reaches the predetermined value the gate is closed. By suitably choosing the values of the constants $k_1$ and $k_2$, the indication on the counting circuit can be calibrated directly in capacitance or resistance units.

In another embodiment of the invention for determining whether the value of the component lies between two limiting values, the gate circuit is opened and closed at times during the discharge period which corresponds to the limiting values. Only if the component under test has a value between the limiting values will an impulse pass through the gate to control an indicator such as, for instance, a neon tube.

In a further embodiment of the invention for the same purpose, the discharge time interval is compared with two known time intervals by the use of three relaxation circuits. Two of the circuits include components of known value while the third includes the component under test. By suitably connecting the outputs of the relaxation circuits to an indicator comprising a plurality of neon tubes, the tubes can be arranged to indicate not only whether the component value is within the desired limits but also if it is not whether the value is below or above said limits.

It frequently happens that repetitive measurements have to be made on a component. Normally each measurement is initiated by a key or like operation. Such repetitive key operation becomes tedious and it is a further object of the invention to provide circuit arrangements which avoid this necessity.

According to this feature of the invention a pair of electromagnetic relays are provided and arranged for automatic sequential operation, one of the relays serving to reset the counting circuit while the other initiates a measuring cycle.

The invention will be better understood from the following description of a number of embodiments taken in conjunction with the accompanying drawings and comprising Figs. 1 to 6. In the drawings, Fig. 1 shows a block schematic of an arrangement for measuring the value of a condenser or a resistance while Fig. 2 shows the detailed circuit.

Fig. 3 shows a block schematic of an arrangement for indicating whether the value of a condenser or a resistance approximates within predetermined limits to a nominal value while Fig. 4 shows the detailed circuit.

Fig. 5 shows an alternate arrangement to that of Fig. 3 and in addition is so arranged that if the component value is outside the predetermined limits, an indication is given whether the value is above or below such limits while Fig. 6 shows the detailed circuit.

Figures 5, 6:
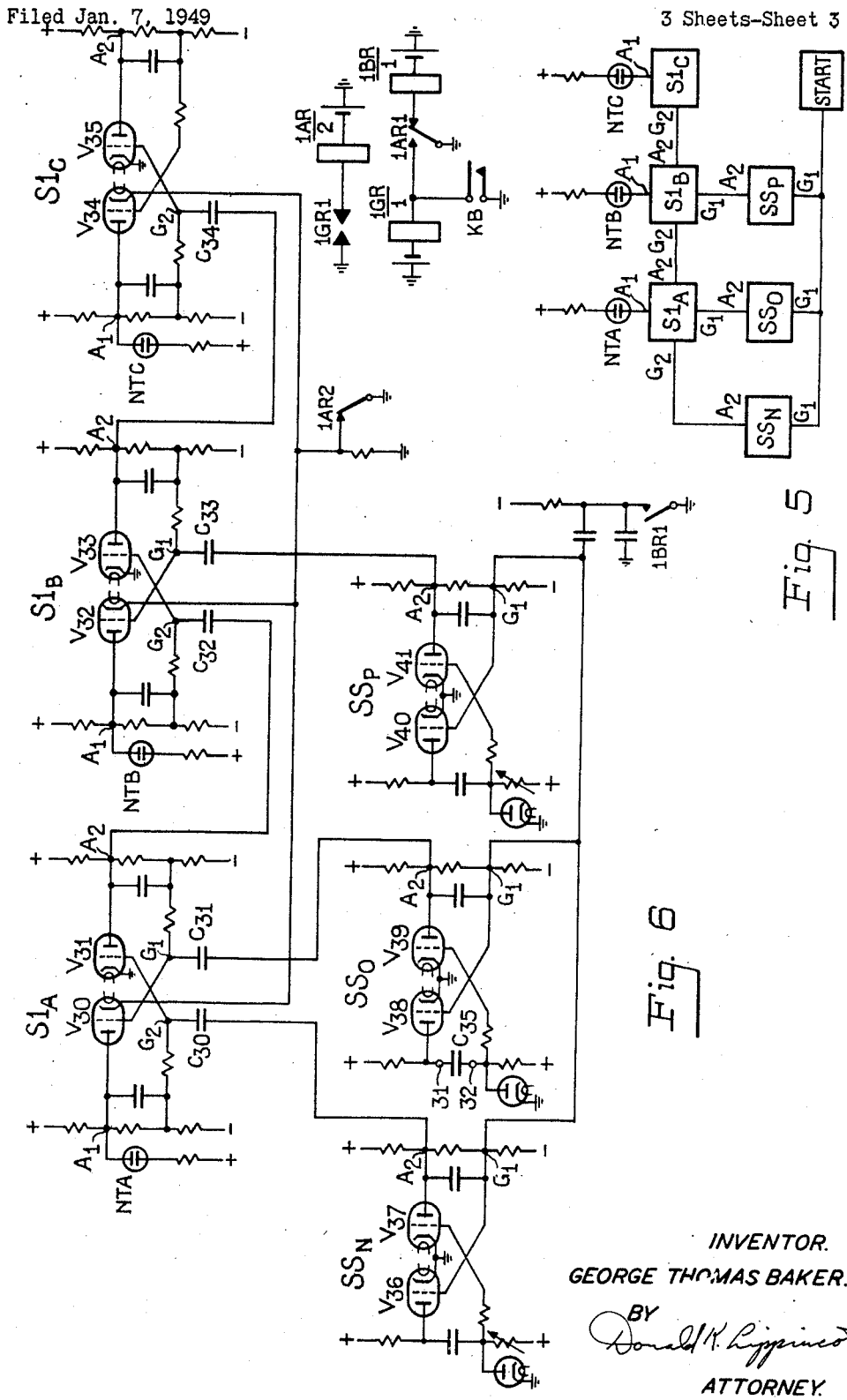

Referring now to Fig. 1, the arrangement comprises a gate circuit G to which accurately timed impulses from the impulse source are applied. The output of the gate circuit is applied to a counting circuit of any known type, preferably a decade counter owing to the ease of indication. The gating action of the gate circuit is controlled by a circuit SS of the type known as a flip-flop or single-shot multivibrator. The circuit SS has a rest position and in response to a start circuit is triggered to an unstable condition from which it reverts to the rest condition after a time depending upon the time constant of a resistor/condenser combination, the combination including the component whose value is required.

The transposition of the circuit SS from the normal to the unstable condition causes the gate G to be opened so that the impulses from the impulse source pass to the counting circuit. At the instant that the circuit SS reverts to its normal condition, the gate is closed and the number of impulses registered on the counting circuit will give an indication of the value of the component. Since the relation between resistance and time or capacitance and time is substantially linear, the counting circuit may be calibrated directed in resistance and/or capacitance values.

Referring now to the detailed circuit diagram shown in Fig. 2, it should be explained that the references such as $A_2$, $G_1$ and C shown in Fig. 1 correspond to the anode of the valve $V_2$, the grid of the valve $V_1$ and the signal input to the gate valve $V_4$ as shown in Fig. 2. A similar method of notation is used in the remaining figures. In Fig. 2 the circuit SS comprises a pair of back-coupled thermionic valves $V_1$ and $V_2$ having their cathodes both connected to earth and the anode of one being back-coupled to the grid of the other. Thus the anode of $V_1$ is connected via the condenser $C_1$ and resistor $R_3$ in series to the grid of the valve $V_2$ while the anode of $V_2$ is connected via the condenser $C_2$ and resistance $R_5$ is parallel to the grid of $V_1$. Anode load resistances $R_1$ and $R_4$ are provided and resistance $R_6$ together with $R_4$ and $R_5$ form a potentiometer across the supply voltage for providing a steady bias to the grid of $V_1$. The grid of $V_2$ is maintained at earth potential by the diode $V_3$ provided for stabilization purposes and resistance $R_2$ is also connected to the positive terminal of the supply voltage. The normal condition of the circuit SS is with $V_2$ conducting since the grid of $V_2$ is at substantially earth potential and so is the cathode. Since $V_2$ is conducting, the potential at its anode $A_2$ is well below the supply voltage and hence the potential applied by means of $R_9$ and $R_{10}$ to the control grid of the gate valve $V_4$ is negative with respect to the cathode of that valve and hence the impulses applied from the impulse source via $C_6$ to the inner control grid will not appear in the anode circuit. The inner control grid of $V_4$ is normally biased to a negative potential by means of the resistors $R_{11}$ and $R_{12}$ while steady positive potentials are applied by means of the potentiometer $R_{14}$, $R_{15}$, $R_{16}$ to the second, third and fifth grids, condensers $C_7$ and $C_8$ being employed for de-coupling purposes.

The start pulse is applied to the grid of $V_1$ by the closing of contact BR1, the control circuits for which will be described subsequently. When BR1 closes, a positive pulse is developed across resistor $R_7$ and is fed via capacitor $C_3$ to the grid of $V_1$. The circuit SS is thus transposed and $V_2$ is rapidly made non-conducting while $V_1$ becomes conducting. Assuming that the value of the condenser $C_1$ is to be determined, it will be noted that in the normal condition of the circuit this condenser is charged substantially to a potential between earth and the positive supply. When $V_1$ becomes conducting however, the voltage of the anode drops and a negative-going pulse is fed to the grid of $V_2$ to cut off $V_2$. The diode $V_3$ now ceases to conduct and the condenser discharges through the resistance $R_2$. The circuit will remain in this condition until the voltage at the point $G_2$ approaches earth when conduction will again begin in the valve $V_2$ and due to the feedback path the circuit will rapidly revert to its normal condition.

When the valve $V_2$ ceases to conduct after the reception of the start signal, its anode voltage will rise and consequently the potential applied to the fourth grid of the gate valve $V_4$ will become positive with respect to the cathode. Impulses from the impulse source will thus pass through the anode load $R_{13}$ and are fed via the condenser $C_9$ to the counting circuit. When the circuit SS reverts to its normal condition, however, the fourth grid of the valve $V_4$ will again become negative with respect to the cathode and cut off the impulses from the anode circuit.

With regard to the generation of the start pulse, this is provided by a circuit which enables repetitive measurements to be effected automatically and consists of an interrupter circuit composing relays GR and AR. Relay GR may, for instance, consist of a type of relay known as a galvanometer relay having a pair of cobalt steel magnets forming an astatic combination, one of the magnets being almost completely enclosed by a pair of deflection coils. The periodic time of oscillation of the magnets is controlled by a spiral hair spring and a robust silver contact GR1 is arranged to close at the end of the return swing, the hair spring being selected so that the galvanometer relay delivers one pulse every two seconds. The closure of contacts GR1 closes the circuit for relay AR which at contacts AR1 completes the circuit for the coils of the galvanometer relay in order to maintain the oscillation. Relay AR in operating in addition at contact AR2 connects a resistance earth instead of direct earth to the cathode circuit of the normally non-conducting valves of the counting circuit thus restoring any of these valves which may be conducting and setting the count to zero. When relay AR releases, relay BR operates and as explained above, at contact BR1 provides the start pulse for the circuit SS. This operation proceeds continuously, a test taking place at each operation of relay BR so that repetitive testing is possible. In operation the voltage supply is first switched on and the key KA is momentarily operated to cause the initial operation of relay GR. After this operation relays GR1, AR and BR interact continuously and a condenser such as $C_1$ may be connected between appropriate terminals on the front panel at any time and repetitive readings of the value of the condenser will continue to be given as long as the condenser is connected to the terminals.

The arrangement shown in schematic form in Fig. 3 and in detail in Fig. 4 provides an indication as to whether the value of the component approximates to the nominal value within predetermined limits. Suppose for instance, that a number of condensers are manufactured having a nominal capacitance of $C_n$. If the constant of proportionality $K_1$ referred to previously is made equal to $10C_n$ and a 1 kc./s. pulse source is used, a capacitance of exactly $C_n$ will indicate 100 time units while the count on any other component will indicate directly its relationship to the nominal value. For production testing it is usually sufficient to indicate whether the deviation exceeds a specified value. For instance, a common tolerance is 10% i. e. for a nominal value of 10 time units the unknown capacitance must register more than 9 and less than 11.

In the arrangement shown in Fig. 3 six scale-of-two circuits are interconnected to form a twelve point cyclic counter $S_{12}$. This is driven continuously from a suitable pulse source and in the zero position, a start pulse is applied to the test multivibrator $SS_A$ which is the same as the corresponding circuit shown in Fig. 2. This start impulse causes the multivibrator $SS_A$ to be transposed and a negative-going pulse is applied to the inner control grid of the gate valve of the gate circuit G which is again similar to that shown in Fig. 2. This negative-going pulse is, however, without effect since the gate valve is already cut-off on the inner grid. The 9th and 11th pulses from the counter $S_{12}$ are applied to a so-called "toggle" circuit $S_1$ which is simply a circuit having tow stable states of equilibrium. The circuit $S_1$ controls the opening and closing of the gate circuit and the arrangement is such that the gate is opened on the 9th and closed on the 11th pulse.

If now the test multivibrator $SS_A$ reverts to its normal condition while the gate circuit is opened, that is to say, between the 9th and 11th pulses, a negative-going pulse will be developed in the anode circuit of the gate valve $V_{24}$ and this will be applied to a second multi-vibrator $SS_B$ which is again similar to the test multivibrator and which acts as a pulse-lengthener. The transposition of the pulse-lengthener due to the negative-going pulse causes the neon tube associated with the pulse-lengthening circuit to flash thereby indicating that the condenser has a value within the stated limits. It will be understood that if the test multivibrator $SS_A$ reverts to its normal condition before the 9th or after the 11th pulse, no pulse will be developed in the anode circuit of the gate valve and the neon tube will not flash.

Referring now to the detailed circuit shown in Fig. 4, the toggle circuit $S_1$ consists of two cross-connected valves $V_{20}$ and $V_{21}$ each having an anode load $R_{20}$ and $R_{25}$ and feed-back circuits from the anode of $V_{20}$ via $R_{21}$, $C_{21}$ and $R_{23}$ to the grid of $V_{21}$ and from the anode of $V_{21}$ via $R_{26}$, $C_{22}$ and $R_{24}$ to the grid of $V_{20}$, the resistances $R_{21}$ and $R_{26}$ being connected to the negative terminal of the supply voltage via resistances $R_{22}$ and $R_{27}$. The values of the various resistances in the toggle circuit are such that the circuit is negatively polarised. The cyclic counter $S_{12}$ is not shown in detail since the circuit is well known and similarly the pulse source for driving the counter is not shown.

In the normal condition of the test multivibrator, valve $V_{23}$ will be conducting and $V_{22}$ will be non-conducting. The zero negative-going pulse from the counter is applied to the grid of $V_{23}$ which transposes the condition of the multivibrator so that $V_{22}$ conducts and a negative-going pulse is developed across the anode load. This is without effect on the inner grid of the gate valve $V_{24}$ since this grid is already biased to cut-off. In the toggle circuit $S_1$, the normal condition is with the valve $V_{20}$ non-conducting and the valve $V_{21}$ conducting. The potential at the point $A_2$ is, therefore, low and hence the fourth grid of the gate valve $V_{24}$ is biased negatively with respect to the cathode. The 9th pulse from the cyclic counter is applied via $C_{23}$ to the grid of $V_{21}$ whereby the condition of the circuit is transposed and $V_{21}$ now becomes non-conducting. The voltage at the point $A_2$, therefore, rises and the potential of the fourth control grid of the gate valve $V_{24}$ becomes positive with respect to the cathode and the gate is opened. The 11th impulse from the counter is applied via $C_{24}$ to the control grid of $V_{20}$ and causes the circuit $S_1$ to revert to its normal condition and the potential of the fourth grid now becomes negative with respect to the cathode and the gate is closed.

The time taken for the test multivibrator $SS_A$ to revert to its original condition will be determined by the value of the condenser $C_{26}$ under test and if this reversion takes place between the 9th and 11th pulse, indicating that the value of the condenser is within the specified limits, then a positive-going pulse will be developed in the anode circuit of $V_{22}$ and will be applied to the inner grid of the gate valve $V_{24}$ at a time when the gate is open. A negative-going pulse will be developed in the anode circuit of the gate valve and this will be fed via the condenser $C_{25}$ to the control grid of the valve $V_{26}$. The normal condition of the pulse lengthening circuit is for $V_{26}$ to be conducting and $V_{25}$ to be non-conducting so that there is not sufficient potential across the neon tube NT to cause it to flash. The pulse obtained from the anode of the valve $V_{24}$ will be negative-going and will transpose the pulse lengthening circuit so that $V_{25}$ now conducts and the voltage at the point $A_1$ will fall to such an extent that the neon tube will flash. It will be understood that the neon tube will only remain lighted for the time taken for the pulse lengthening circuit to revert to its normal condition and this duration is suitably selected so that the lighting of the neon tube is easily visible.

It will be understood that the circuit will operate continuously so that if desired, a number of tests may be made on each component.

Once the high tension supply is connected to the circuit the only operation necessary to effect the test is to connect the condensers one by one to the terminals 21 and 22. Thus the whole equipment may be controlled by a single switch for connecting up the H. T. supply and a pair of terminals will be provided on the panel of the instrument to which the component under test is connected.

The circuit shown in Figs. 5 and 6 is a refinement of that shown in Figs. 3 and 4 in that if the value of the component is not within the specified limits, an indication is given as to whether it is below or above such limits. Referring first to Fig. 5, the equipment comprises three multivibrators $SS_N$, $SS_O$ and $SS_P$ of which the multivibrator $SS_O$ includes the component under test. The other two multivibrators include fixed condensers and provide two time periods, a minimum $T_N$ and a maximum $T_P$. The actual time $T_O$ corresponding to the nominal value of the capacitor is immaterial but is conveniently taken to be about 0.4 second, corresponding to a $1\mu f$. condenser associated with a 100 k. ohms resistance. Part of the resistance in the timing circuit of the multivibrator $SS_N$ is made variable and a similar variable is employed in the timing circuit of the multivibrator $SS_P$. Over the range covered, time is linear with resistance so that the scales of the variables can be calibrated directly in percentage decrease or increase on $T_O$. The resistance associated with the multivibrator $SS_O$ can be set so that the nominal capacitance of the unknown condenser corresponds to a release time of $T_O$. For a condenser within the specified limits, $T_N < T_O < T_P$ so that if the three multivibrators are set in operation simultaneously, they will revert in the order $SS_N$, $SS_O$, $SS_P$. The order in which they actually revert is indicated by the three toggle circuits $S1_A$, $S1_B$ and $S1_C$. In the normal condition of these circuits the neon tubes NTA, NTB and NTC are extinguished. If the multivibrator $SS_N$ reverts to its normal condition before the multivibrator $SS_O$, a pulse is fed from $SS_N$ to $S1_A$ to cause the neon tube NTA to glow. Then when the multivibrator $SS_O$ reverts, the tube NTA is extinguished and a negative pulse is fed from $S1_A$ to $S1_B$ to cause the neon tube NTB to glow. Finally when the multivibrator $SS_P$ reverts, the neon tube NTB is extinguished and a negative pulse is fed to $S1_C$ to cause the neon tube NTC to glow. When the test has been completed, the neon tube NTC is extinguished and a second start signal is given by relay equipment similar to that shown in Fig. 2.

If however, the multivibrator $SS_O$ reverts before the multivibrator $SS_N$, the pulse applied to $S1_A$ by $SS_O$ will be without effect while that subsequently applied by $SS_N$ will cause the neon tube NTA to glow but neither the neon tube NTB nor NTC will glow since no pulse is passed on from $S1_A$ to $S1_B$ or $S1_B$ to $S1_C$. Further the reversion of $SS_P$ is without effect, so that the tube NTA continues to glow. Again if the multivibrator $SS_O$ reverts after both the multivibrators $SS_N$ and $SS_P$ the neon tube NTA will glow when $SS_N$ reverts and will be extinguished when $SS_O$ reverts and a pulse will be fed over $S1_A$ to $S1_B$ to cause the neon tube NTB to glow. This tube will, however, glow after the normal extinguishing pulse has been fed thereto by the multivibrator $SS_P$ and consequently no pulse will be fed to $S1_C$. In this condition, therefore, the neon tube NTB remains lighted.

Thus if the condenser is within the specified limits, the neon tube NTC remains lighted while if the value is less than the lower limit the neon tube NTA remains lighted, and if it is greater than the maximum limit the neon tube NTB remains lighted.

Referring now to Fig. 6 which shows the circuits in detail, the multivibrators $SS_N$, $SS_O$ and $SS_P$ are similar to the multivibrator SS shown in Fig. 2 while the toggle circuits $S1_A$, $S1_B$ and $S1_C$ are similar to the toggle circuit S1 shown in Fig. 4, and are also arranged to respond only to negative-going impulses, the negative bias applied to the control grids being sufficiently large to prevent triggering by any of the positive-going impulses applied thereto.

The condenser under test is connected between terminals 31 and 32 in the multivibrator $SS_O$ and it will be understood that the normal condition of the multivibrators is with the valves $V_{37}$, $V_{39}$ and $V_{41}$ conducting. As regards the toggle circuits the normal condition is with the valves $V_{31}$, $V_{33}$ and $V_{35}$ conducting.

A start pulse is applied to the three multivibrators in parallel by the operation of relay 1BR. This start pulse will be positive-going and is applied to the grids of the non-conducting valves $V_{36}$, $V_{38}$ and $V_{40}$. The three multivibrators are transposed substantially simultaneously and consequently positive-going pulses will be developed at the points $A_2$. These positive-going pulses will be applied to the toggle circuits $S1_A$ and $S1_B$ but as previously pointed out, they will be without effect as the toggle circuits are polarised to respond only to negative pulses. Assuming first that the condenser under test is within the specified limits, then the multivibrator $SS_N$ will be the first to revert to normal. When this takes place, the valve $V_{37}$ becomes conducting and a negative-going pulse is fed from the anode of $V_{37}$ via condenser $C_{30}$ to the grid of valve $V_{31}$ which it will be remembered is conducting. This pulse, therefore, cause the toggle circuit to be transposed so that the anode voltage of $V_{31}$ increases and that of $V_{30}$ decreases. The increase in anode voltage of $V_{31}$ is without effect on the toggle circuit $S1_B$ while the decrease of anode voltage of $V_{30}$ causes a potential difference to be developed across the neon tube NTA which thereupon glows.

The circuit remains in this condition until the multivibrator $SS_O$ reverts to normal when a negative-going pulse from the anode of $V_{39}$ is applied via the condenser $C_{31}$ to the grid of $V_{30}$. This causes the toggle circuit $S1_A$ to revert to its original condition whereby the neon tube NTA is extinguished and a negative-going pulse is fed from the anode of $V_{31}$ via condenser $C_{32}$ to the grid of $V_{33}$ of the toggle $S1_B$. The toggle $S1_B$ is thereby transposed and the neon tube NTB glows in a similar manner to that described for the toggle circuit $S1_A$. The circuit remains in this condition until the multivibrator $SS_P$ reverts to normal when a negative-going pulse from the anode of $V_{41}$ is fed via condenser $C_{33}$ to the grid of $V_{32}$ thereby causing the neon tube NTB to be extinguished and a negative-going pulse to be fed from the anode of $V_{33}$ via condenser $C_{34}$ to the grid of the valve $V_{35}$ of the toggle circuit $S1_C$. This toggle circuit is consequently transposed and the neon tube NTC is lighted. The circuit remains in this condition until relay 1AR is again operated when resistance earth is connected in place of direct earth to the cathodes of the valves $V_{30}$, $V_{32}$ and $V_{34}$ thus causing any operated toggle circuit to be restored to normal.

It will now be assumed that the value of the condenser under test is below the lower of the specified limits. In this case the multivibrator SSo will revert to normal before the multivibrator SSN. When the multivibrator SSo reverts, a negative pulse will be applied via condenser C31 to the grid of V30 but will be without effect since this valve is non-conducting at this time. The negative-going pulse subsequently obtained from the multivibrator SSN will be applied via condenser C30 to the grid of valve V31 and will cause the toggle circuit S1A to be transposed as previously described. The neon tube NTA is, therefore, lighted and remains lighted since the pulse which would normally cause its extinction has already been received and has been without effect. Further when the multivibrator SSP reverts to normal a negative pulse will be applied via condenser C33 to the grid of V32 and this again will be without effect since the V32 is non-conducting at this time. The neon tube NTA, therefore, remains lighted until the resetting pulse is provided on the operation of relay 1AR.

If the value of the condenser under test is above the upper specified limit, the multivibrator SSN will first revert and cause the lighting of the tube NTA as previously described. In this case the second multivibrator to revert will be SSP whereupon a negative-going impulse is applied via C33 to the grid of V32. This will be without effect since the valve V32 is non-conducting at this time. When the multivibrator SSo finally reverts, the neon tube NTA will be extinguished and a negative-going pulse will be fed from S1A via C32 to the grid of V33 and the circuit S1B will be transposed to cause the lighting of the neon tube NTB and this tube will remain lighted until the resetting pulse is obtained by the operation of relay 1A.

With regard to the generation of the start and resetting pulses, the arrangement of relays 1AR, 1BR and 1GR are the same as that shown in Fig. 2 and are set in operation by the momentary depression of key KB. Contact 1BR1 provides the positive-going start pulse while contact 1AR2 causes the reversion of any operated toggle circuits as described above.

I claim:

1. Circuit arrangements for indicating the values of resistors and capacitors comprising a time constant circuit including a resistor and a capacitor combination of which one element is the component to be measured, means for charging and discharging said capacitor, a gate circuit, an impulse source feeding said gate circuit, an electronic counter, a flip-flop circuit means for controlling the opening of said gate circuit in a change from a stable to an unstable condition to enable pulses from said source to operate said counter and means including the component to be tested for returning the flip-flop circuit to a stable condition after a time period proportional to the magnitude of the component for controlling thereby the closing of said gate circuit in response to a voltage change across the capacitor element of the time constant circuit.

2. Circuit arrangements for indicating the values of resistors and capacitors comprising a single-shot multivibrator, a capacitor connected between the anode of the normally non-conducting tube and the control grid of the normally conducting tube, a charging circuit for said capacitor effective in the normal condition of said multivibrator, a discharging circuit for said capacitor, including a resistor, either of said resistor and capacitor being the component whose value is required, a gate circuit, an impulse source feeding said gate circuit, an electronic counter, switching means for changing the condition of said multivibrator circuit to render said capacitor discharge circuit effective and simultaneously to open said gate circuit to enable pulses from said source to operate said counter and means for restoring said multivibrator circuit to its initial condition when the voltage across said condenser reaches a predetermined value to close said gate circuit.

3. Circuit arrangements for indicating the values of resistors and capacitors comprising a relaxation circuit having a stable and an unstable condition and including a pair of thermionic tubes, a D. C. connection between the anode of one tube and the control grid of the second, an A. C. connection between the anode of the second and the control grid of the first, a charge circuit for said capacitor effective in the stable condition of said relaxation circuit, a discharge circuit for said capacitor including a resistor, either of said capacitor and said resistor forming the component whose value is required, a third thermionic tube having at least a cathode, an anode and two control grids, an impulse source connected to an inner control grid, a connection between said relaxation circuit and a normally negatively biased outer control grid, an electronic counter connected to the anode of said third tube, relay means for changing said relaxation circuit from its stable to its unstable condition to render said discharge circuit effective and to apply a positive potential to said outer control grid whereby impulses from said source are enabled to operate said counter and means effective when the potential across said condenser falls by a predetermined amount from its initial value for causing said relaxation circuit to revert to its stable condition and for replacing said negative bias on said outer control grid.

GEORGE THOMAS BAKER.

REFERENCES CITED

The following references are of record in the file of this patent:

UNITED STATES PATENTS

| Number | Name | Date |
|---|---|---|
| 2,044,424 | Edwards et al. | June 16, 1936 |
| 2,332,300 | Cook | Oct. 19, 1943 |
| 2,408,727 | Blitz | Oct. 8, 1946 |
| 2,504,848 | Kunz | Apr. 18, 1950 |